United States Patent
Gong et al.

(10) Patent No.: US 9,908,567 B2
(45) Date of Patent: Mar. 6, 2018

(54) ELECTRIC VEHICLE FRAME SYSTEM

(71) Applicant: SHENZHEN ZHILUN DRIVING TECHNOLOGY FOR ELECTRIC VEHICLE CO., LTD., Guangdong (CN)

(72) Inventors: Shugang Gong, Guangdong (CN); Mu Xie, Guangdong (CN); Yinlong Kong, Guangdong (CN); Weichun Li, Guangdong (CN); Jianfeng Zhang, Guangdong (CN)

(73) Assignee: SHENZHEN ZHILUN DRIVING TECHNOLOGY FOR ELECTRIC VEHICLE CO., LTD., Guangdong (CN)

( * ) Notice: Subject to any disclaimer, the term of this patent is extended or adjusted under 35 U.S.C. 154(b) by 0 days.

(21) Appl. No.: 15/300,453

(22) PCT Filed: Apr. 1, 2014

(86) PCT No.: PCT/CN2014/074514
§ 371 (c)(1),
(2) Date: Sep. 29, 2016

(87) PCT Pub. No.: WO2015/149268
PCT Pub. Date: Oct. 8, 2015

(65) Prior Publication Data
US 2017/0129546 A1  May 11, 2017

(51) Int. Cl.
*B62D 29/00* (2006.01)
*B62D 21/15* (2006.01)
(Continued)

(52) U.S. Cl.
CPC ........... *B62D 29/008* (2013.01); *B62D 21/02* (2013.01); *B62D 21/152* (2013.01);
(Continued)

(58) Field of Classification Search
CPC ...... B62D 21/07; B62D 29/041; B62D 21/02; B62D 21/11; B62D 21/12; B62D 27/02
(Continued)

(56) References Cited

U.S. PATENT DOCUMENTS 2,009,963 A * 7/1935 Matthaei ................ B62D 21/02
                                              182/228.1
5,561,902 A * 10/1996 Jacobs ..................... B21D 5/08
                                              280/785

(Continued)

FOREIGN PATENT DOCUMENTS

CN           1162291 A      10/1997
CN          101565057 A     10/2009
(Continued)

OTHER PUBLICATIONS

International Search Report of PCT/CN20141074514 dated Nov. 26, 2014.
(Continued)

*Primary Examiner* — D Glenn Dayoan
*Assistant Examiner* — Sunsurraye Westbrook
(74) *Attorney, Agent, or Firm* — Loza & Loza, LLP; Michael Fedrick (57) ABSTRACT

An electric vehicle frame system, including two multi-cavity box type longitudinal beams which are arranged symmetrically and are made of an aluminum alloy material, and a multi-cavity transverse beam assembly which is connected between the two multi-cavity box type longitudinal beams and is made of aluminum alloy material, wherein the multi-cavity box type longitudinal beam is provided internally with multiple independent cavities, and the multi-cavity transverse beam assembly includes multiple transverse beams which are provided internally with multiple independent cavities; and further having a front bumper system and
(Continued)

a rear bumper system which are respectively provided at both ends of the multi-cavity box type longitudinal beams, and a B pillar holder provided in the middle of the multi-cavity box type longitudinal beams. The multi-cavity box type longitudinal beams and the multi-cavity transverse beam assembly are made of an aluminum alloy profile, such that not only a support structure is formed to support the body of the electric vehicle, but also the overall weight of the frame can be reduced; and the frame has a simple structure, is easy to process and mold, can greatly simplify the production process and reduce production costs, and the independent cavities inside the frame can also be used as cable channels, oil pipelines and other pipelines.

12 Claims, 5 Drawing Sheets

(51) Int. Cl.
  *B62D 25/04* (2006.01)
  *B62D 23/00* (2006.01)
  *B62D 21/02* (2006.01)
  *B62D 25/20* (2006.01)

(52) U.S. Cl.
  CPC .......... *B62D 23/005* (2013.01); *B62D 25/04* (2013.01); *B62D 25/2018* (2013.01); *B62D 25/2027* (2013.01); *B62D 25/2036* (2013.01)

(58) Field of Classification Search
  USPC ...... 296/102, 205; 264/512; 29/421.1, 897.2
  See application file for complete search history.

(56) References Cited

U.S. PATENT DOCUMENTS

| | | | |
|---|---|---|---|
| 5,813,266 A * | 9/1998 | Ash | B21D 22/025 29/421.1 |
| 6,769,178 B1 | 8/2004 | Beckman | |
| 8,002,064 B2 * | 8/2011 | Yamada | B62D 21/02 180/311 |
| 2006/0113805 A1 | 6/2006 | Wakefield | |

FOREIGN PATENT DOCUMENTS

| | | |
|---|---|---|
| CN | 201437374 U | 4/2010 |
| CN | 103231738 A | 8/2013 |
| CN | 103269941 A | 8/2013 |
| CN | 203237289 U | 10/2013 |
| JP | 2013082250 A | 5/2013 |

OTHER PUBLICATIONS

Espacenet bibliographic data for JP Publication No. 2013082250 published May 9, 2013, 2 pages.
Espacenet bibliographic data for CN Publication No. 203237289 published Oct. 16, 2013, 1 page.
Espacenet bibliographic data for CN Publication No. 101565057 published Oct. 28, 2009, 1 page.
Espacenet bibliographic data for CN Publication No. 1162291 published Oct. 15, 1997, 2 pages.
Espacenet bibliographic data for CN Publication No. 201437374 published Apr. 14, 2010, 1 page.
Espacenet bibliographic data for CN Publication No. 103269941 published Aug. 28, 2013, 1 page.
Espacenet bibliographic data for CN Publication No. 103231738 published Aug. 7, 2013, 2 pages.

* cited by examiner

ELECTRIC VEHICLE FRAME SYSTEM

FIELD OF THE INVENTION

The invention belongs to the field of electric vehicle technology; particularly, the invention claims an electric vehicle frame system.

BACKGROUND OF THE INVENTION

A current all-electric vehicle generally uses a frameless self-supporting body (similar to the structure of a bird nest), which is a traditional vehicle body technology. A self-supporting body has a closed ring structure, with the entire body supporting loads and upper and lower structures forming a whole. When supporting loads, the entire body shell gets into a stable and balanced state. However, a self-supporting body's covering parts involve a complex processing technology and high cost of molds and welding.

On the market, there are some all-electric vehicles with a body rather than a self-supporting body (namely, the entire body is supported by a frame). These vehicles generally use a welded trapezoidal frame with steel construction and integral longitudinal beams. However, such vehicles are heavy and involve large deformation and complex welding devices.

SUMMARY OF THE INVENTION

Technical Problem

The invention is intended to provide an electric vehicle frame system to solve the problem of electric vehicles in the prior art being heavy and involving large deformation and complex welding devices due to use of a welded trapezoidal frame with steel construction and integral longitudinal beams.

Solution to the Problem

Technical Solution

The invention provides a technical solution as follows: an electric vehicle frame system, comprising two multi-cavity box type longitudinal beams which are arranged symmetrically and are made of an aluminium alloy material, and a multi-cavity transverse beam assembly which is connected between the two multi-cavity box type longitudinal beams and is made of aluminium alloy material, a front bumper system and a rear bumper system which are respectively provided at both ends of the multi-cavity box type longitudinal beams, and a B pillar holder provided in the middle of the multi-cavity box type longitudinal beams to hold the B pillar; the multi-cavity box type longitudinal beam is provided internally with multiple independent cavities and comprises a middle section and curved sections provided on both ends of the middle section; the multi-cavity transverse beam assembly includes multiple transverse beams which are provided internally with multiple independent cavities.

Specifically, the transverse beam assembly comprises a front transverse beam provided on the front ends of the two multi-cavity box type longitudinal beams, a rear transverse beam provided on the rear ends of the two multi-cavity box type longitudinal beams, two middle transverse beams and two combined transverse beams provided on the middle of the two multi-cavity box type longitudinal beams. The two middle transverse beams set apart and two combined transverse beams are set apart.

More specifically, multiple first reinforcing connecting rods are provided between the two middle transverse beams.

Specifically, multiple second reinforcing connecting rods are provided between the two combined transverse beams.

Specifically, the middle transverse beam comprises an inverted H-shaped base and a rectangular part on the base. The rectangular part is provided internally with multiple independent cavities.

Specifically, the combined transverse beam is an axisymmetric structure formed by the two middle transverse beams butted together, with their rectangular parts facing each other.

More specifically, the electric vehicle frame system further comprises a first holder provided at the junction of the multi-cavity box type longitudinal beam and the front transverse beam for holding exterior parts, and a second holder provided at the junction of the multi-cavity box type longitudinal beam and the rear transverse beam for holding exterior parts.

Specifically, the B pillar holder comprises a U-shaped base and two arc-shaped parts provided at both ends of the U-shaped base. The two arc-shaped parts are curved outwards and connected with the multi-cavity box type longitudinal beam. The U-shaped base body is provided with a reinforcing rib in its middle.

Specifically, the front bumper system comprises a front cross bar connected to the front transverse beam and a front bumper with both ends connected respectively to the front cross bar and the front transverse beam. The front bumper is curved and perpendicular to front cross bar and the front transverse beam, and protrudes relatively to the front cross bar.

Specifically, ends of the front bumper are connected to the front transverse beam via a shock absorbing ring. At least one first vertical bar is positioned between the front cross bar and the middle transverse beam. The first vertical bar is provided with a first column on it.

Furthermore, the rear bumper system comprises of a rear cross bar connected to the rear transverse beam and a rear bumper with both ends connected respectively to the rear cross bar and the rear transverse beam. The rear bumper is curved and perpendicular to rear cross bar and the rear transverse beam, and protrudes relatively to the rear cross bar.

Furthermore, ends of the rear bumper are connected to the rear transverse beam via a shock absorbing ring. At least one second vertical bar is positioned between the rear cross bar and the combined transverse beam. The second vertical bar is provided with a second column on it.

Beneficial Effects of the Invention

Beneficial Effects

The invention provides an electric vehicle frame system, comprising multi-cavity box type longitudinal beams and multi-cavity transverse beams made of an aluminium alloy material, forming a supporting structure that supports the electric vehicle body and reducing the total weight of the frame. This frame system is structurally simple and easy to process and form, enabling the production process to be greatly simplified and the production cost to be reduced. Furthermore, the multi-cavity box type longitudinal beams and multi-cavity transverse beams are provided internally with multiple independent cavities that can be used as channels for wiring, exhaust duct, air duct, oil line and other lines of an electric vehicle. This eliminates the need to provide special channels for the wiring and lines, simplifies the overall structure of an electric vehicle, makes electric vehicle assembly and production easier, and reduces the production cost.

DETAILED DESCRIPTION OF THE PREFERRED EMBODIMENT

Detailed Description of Preferred Embodiments of the Invention

The present invention will now be described in detail with reference to the accompanying drawings representing preferred embodiments to more clearly clarify the purpose, technical solution and advantages of the invention. It should be understood that the preferred embodiments described herein are only to explain the invention and are not intended to limit the invention.

Figure 5:
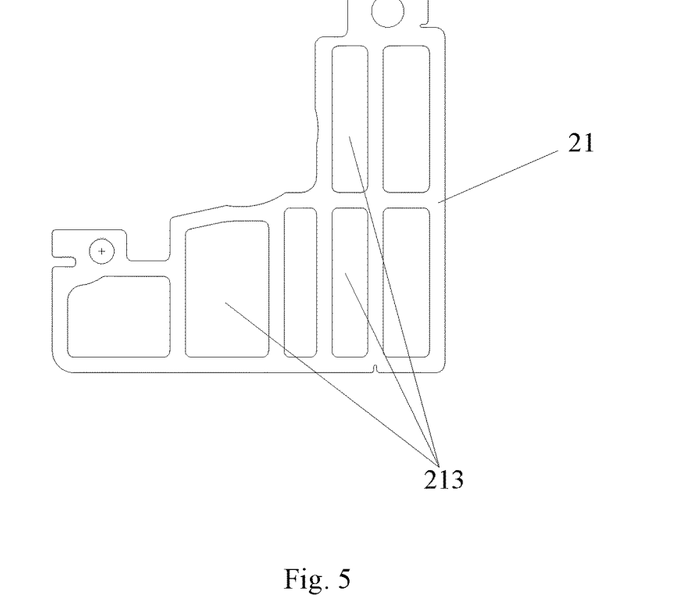
FIG. 5 depicts a sectional view of a multi-cavity box type longitudinal beam of the electric vehicle frame system in FIG. 1.

FIG. 1 through FIG. 4 are views depicting an electric vehicle frame system according to the embodiments of the invention. The electric vehicle frame system comprises two multi-cavity box type longitudinal beams 21 which are arranged symmetrically and are made of an aluminium alloy material, and a multi-cavity transverse beam assembly 22 which is connected between the two multi-cavity box type longitudinal beams 21 and is made of an aluminium alloy material. Specifically, together with reference to FIG. 5 and FIG. 6, the multi-cavity box type longitudinal beam 21 is provided internally with multiple independent cavities 213; the multi-cavity transverse beam assembly 22 includes multiple transverse beams which are provided internally with multiple independent cavities. The cavities in the multi-cavity box type longitudinal beams 21 and transverse beams may have any shapes such as rectangle, circle and polygonal. The multi-cavity box type longitudinal beams 21 and the multi-cavity transverse beam assembly 22 together form the supporting structure of the entire electric vehicle body. The multi-cavity box type longitudinal beams 21 and the multi-cavity transverse beam assembly 22 are provided internally with multiple independent cavities, reducing the total weight of the frame and capable of serving as channels for wiring, exhaust duct, air duct, oil line and other lines of an electric vehicle.

The electric vehicle frame system provided by the invention further comprises a front bumper system 23 and a rear bumper system 24 provided respectively on both ends of the multi-cavity box type longitudinal beams 21, and two B pillar holders 25 provided in the middle of the multi-cavity box type longitudinal beams 21 for holding B pillars of the electric vehicle.

The electric vehicle frame system provided by the invention has only B pillar holders and no holders for holding A pillars or C pillars, and therefore, its structure is simpler than the traditional electric vehicle frame structure. The front bumper system 23 and the rear bumper system 24 protect the electric vehicle from being easily damaged when suffering front or rear impact. Moreover, the multi-cavity box type longitudinal beam 21 comprises a middle section 211 and two curved sections 212 provided respectively on both ends of the middle section 211. The middle section 211 may be straight or arc-shaped with slight protrusion upward. A protruded arc-shaped middle section 211 provides a better trafficability for an electric vehicle.

The invention provides an electric vehicle frame system, comprising multi-cavity box type longitudinal beams 21 and multi-cavity transverse beams made of an aluminium alloy material, forming a supporting structure that supports the electric vehicle body and reducing the total weight of the frame. This frame system is structurally simple and easy to process and form, enabling the production process to be greatly simplified and the production cost to be reduced. Moreover, the multi-cavity box type longitudinal beams 21 and transverse beams are provided internally with multiple independent cavities that can be used as channels for wiring, exhaust duct, oil line and other lines of an electric vehicle. This eliminates the need to provide special channels for the wiring and lines, simplifies the overall structure of an electric vehicle, makes electric vehicle assembly and production easier, and reduces its production cost.

The transverse beam assembly comprises a front transverse beam 221 provided on the front ends of the two multi-cavity box type longitudinal beams 21, a rear transverse beam 222 provided on the rear ends of the two multi-cavity box type longitudinal beams 21, middle transverse beams 223 and combined transverse beams 224 provided on the middle of the two multi-cavity box type longitudinal beams 21. The middle transverse beams 223 and the combined transverse beams 224 are both connected to the middle section 211 of the multi-cavity box type longitudinal beam 21, and the front transverse beam 221 and rear transverse beam 222 are respectively connected respectively to the curved sections 212 at both ends of the multi-cavity box type longitudinal beam 21. Said transverse beams are provided between the two multi-cavity box type longitudinal beams 21 and these beams together form the main supporting structure of the trapezoidal frame system to support the vehicle body and other parts.

Moreover, the two middle transverse beams 223 are set apart and the two combined transverse beams 224 are also set apart. To enable the seats of an electric vehicle to be stably supported, the middle transverse beams 223 and the combined transverse beams 224 can be provided respectively in positions where front and rear seats are placed in the electric vehicle.

Figure 6:
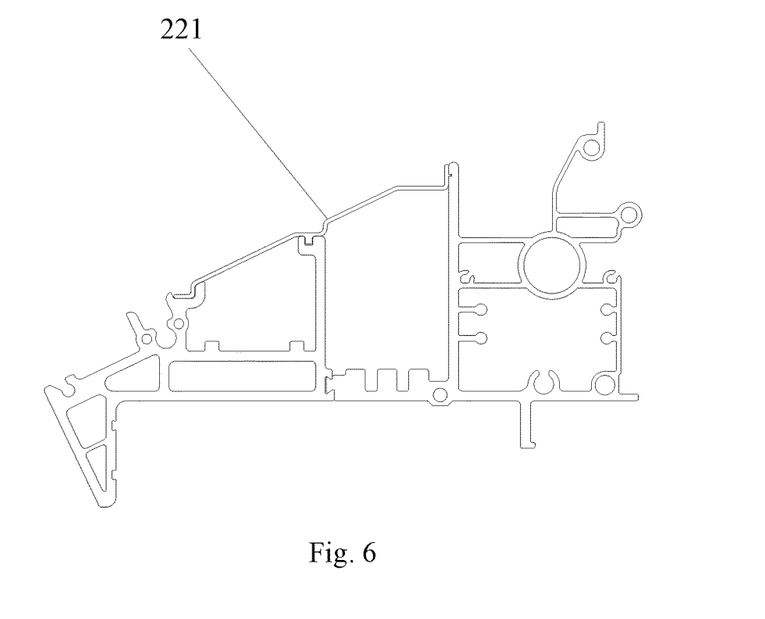
FIG. 6 depicts a sectional view of a front transverse beam of the electric vehicle frame system in FIG. 1.
Figure 7:
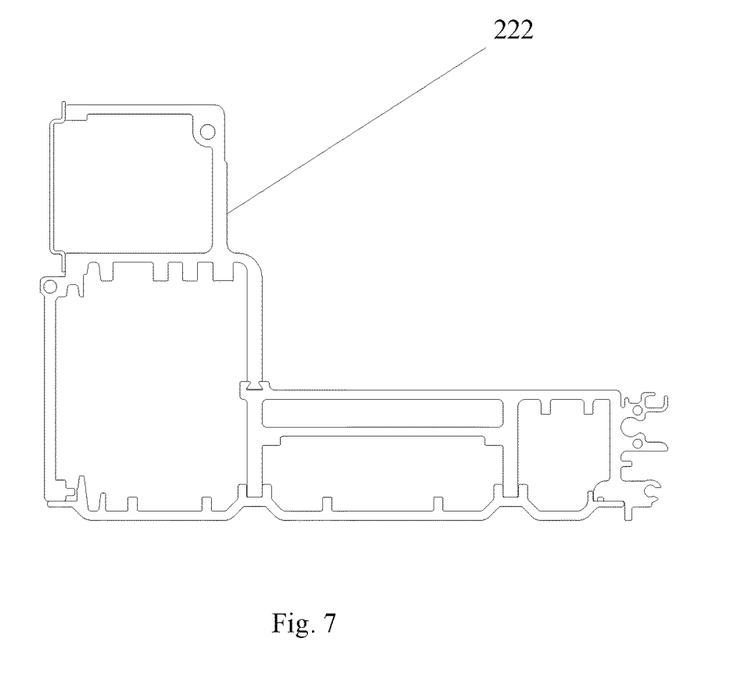
FIG. 7 depicts a sectional view of a rear transverse beam of the electric vehicle frame system in FIG. 1.

To enhance the shock absorbing capacity of the front transverse beam 221 and the rear transverse beam 222, the front transverse beam 221 and the rear transverse beams 222 can be designed as multi-cavity structures with multiple internal independent cavities. FIG. 6 and FIG. 7 show the sectional views of front transverse beam 221 and the rear transverse beam 222 respectively. Mounting slots or mounting holes may also be set in the front transverse beam 221 and the rear transverse beam 222 for mounting other components.

To enhance the structural strength of the two transverse beams 223 and improve the structural stability of the entire electric vehicle frame system, multiple first reinforcing connecting rods 225 can be provided between the two middle transverse beams 223 to strengthen the stability of the middle transverse beams 223 and the entire electric vehicle frame system. The first reinforcing connecting rod 225 may also be designed as a multi-cavity structure.

Likewise, multiple second reinforcing connecting rods 226 can be provided between the two combined transverse beams 224 to strengthen the stability of the middle transverse beams 223 and the entire electric vehicle frame system.

Figure 8:
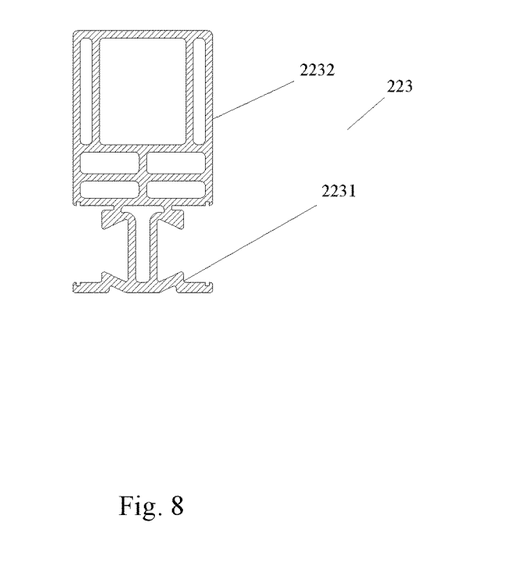
FIG. 8 depicts a sectional view of a middle transverse beam of the electric vehicle frame system in FIG. 1.

Specifically, with reference to FIG. 8, the middle transverse beam 223 comprises an inverted n-shaped base 2231 and a rectangular part 2232 on the base 2231 that forms an integral part with the base 2231. The rectangular part 2232 is provided internally with multiple independent cavities. Likewise, the cavities in the base 2231 and the rectangular part 2232 can serve as channels for wiring, air duct, oil line and other lines for accessories of an electric vehicle to pass through so as to improve the utilization of space and simplify the entire structure of an electric vehicle.

With reference to FIG. 8, in the embodiment, the middle transverse beam 223 is provided internally with eight independent cavities, the cross section shape of which may be rectangle, T-shape, circle or otherwise; however, the number and cross section shape of such cavities are not limited thereby.

Figure 9:
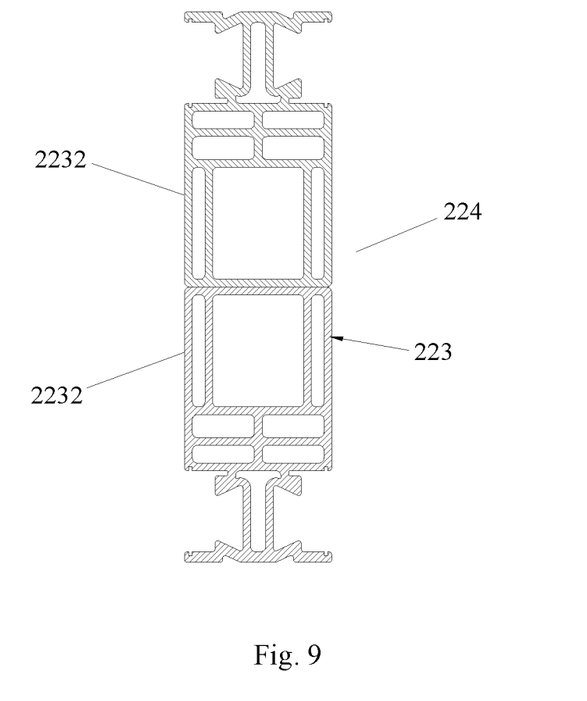
FIG. 9 depicts a sectional view of a combined transverse beam of the electric vehicle frame system in FIG. 1.

The combined transverse beam 224 is formed by two middle transverse beams 223 butted together. With reference to FIG. 9, the outer ends of the two middle transverse beams 223 face each other and are butted together, whereby the combined transverse beam 224 has an axisymmetric structure. The combined transverse beam 224 is also provided internally with multiple independent cavities that can also serve as channels for wiring, air duct, gas duct oil line and other lines.

Figure 1:
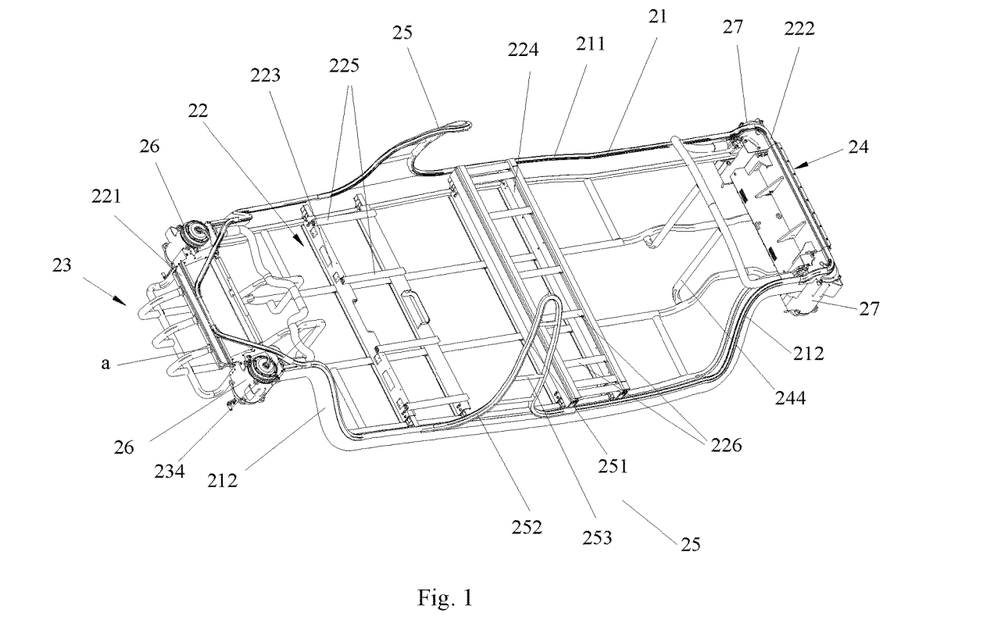
FIG. 1 depicts a perspective view of an electric vehicle frame system according to the embodiments of the invention.
Figure 2:
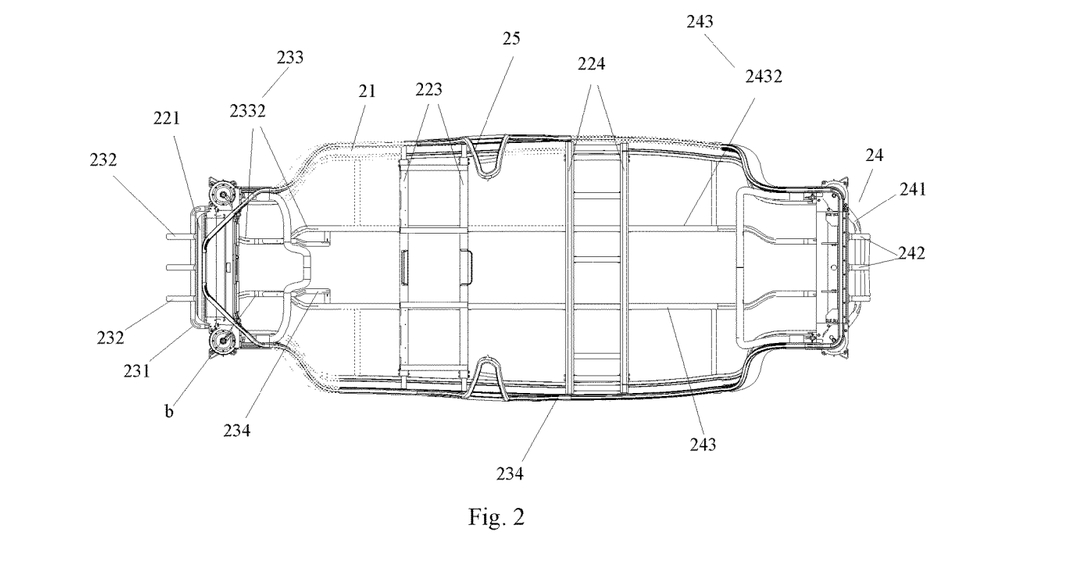
FIG. 2 depicts a top view of the electric vehicle frame system in FIG. 1.
Figure 3:
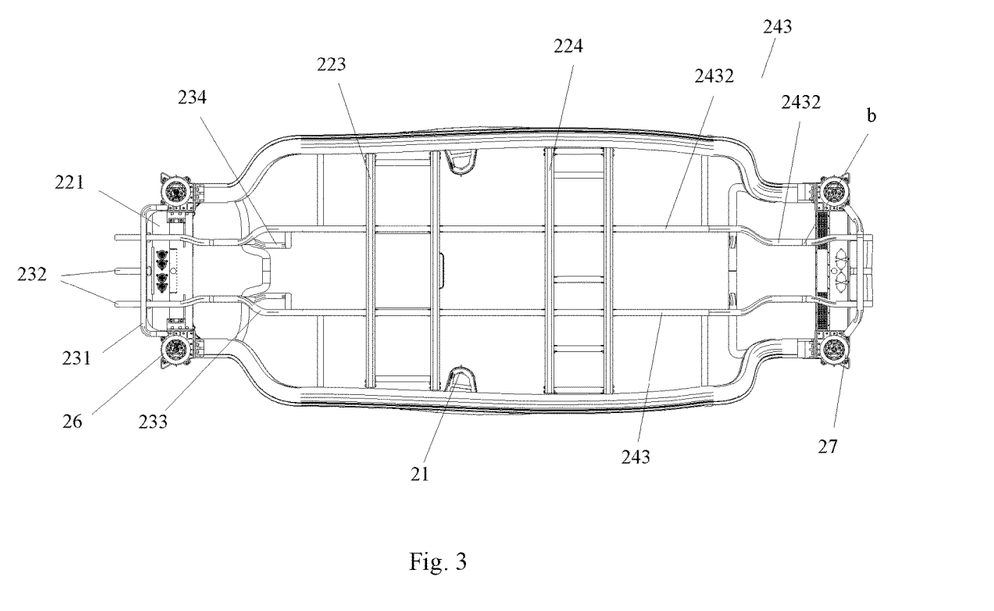
FIG. 3 depicts a bottom view of the electric vehicle frame system in FIG. 1.
Figure 4:
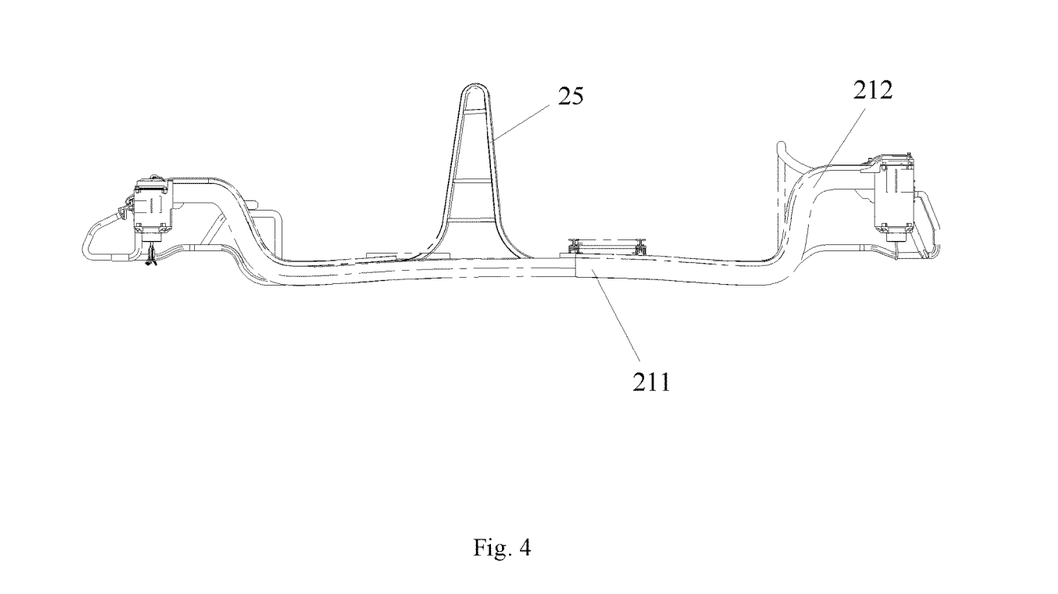
FIG. 4 depicts a bottom view of the electric vehicle frame system in FIG. 1.

With reference to FIG. 1 to FIG. 3, the electric vehicle frame system further comprises first holders 26 provided at the junction of the multi-cavity box type longitudinal beam 21 and the front transverse beam 221 for holding exterior parts, and second holders 27 provided at the junction of the multi-cavity box type longitudinal beam 21 and the rear transverse beam 222 for holding exterior parts. The first holders 26 and second holders 27 can both be designed as multi-cavity structures, with cavities to hold parts such as cables to improve the utilization of space, simplify the electric vehicle structure, and reduce weight.

In the embodiment, two first holders 26 are provided respectively at the both ends of the front transverse beam 221 and the two second holders 27 are provided respectively at the both ends of the rear transverse beam 222. These holders can be used for hold other components such as a steering motor depending on the requirements.

The B pillar holder 25 comprises a U-shaped base 251 and two arc-shaped parts 252 provided at both ends of the U-shaped base 251. The two arc-shaped parts 251 are curved outwards and connected with the multi-cavity box type longitudinal beam 21. The B pillar holder 25 is designed to hold a B pillar of the electric vehicle. The U-shaped base body is provided with a reinforcing rib 253 in its middle to enhance the strength and structural stability of the B pillar holder 25.

The electric vehicle frame system according the embodiment is provided B pillar holders 25 only to hold B pillars, without holders to hold A pillars and C pillars so that the frame system is structurally simpler and easier to produce and assemble.

The front bumper system 23 comprises a front cross bar 231 connected to the front transverse beam 221 and a front bumper 232 with both ends connected respectively to the front cross bar 231 and the front transverse beam 221. The front bumper 232 is curved and perpendicular to front cross bar 231 and the front transverse beam 221. The front bumper 232 protrudes relatively to the front cross bar 231 so that when the electric vehicle suffers front impact, external force will first acts on the front bumper 232. Furthermore, the front bumper 232 can be designed as a multi-cavity structural rod to improve its buffering and impact resistant capability.

To further improve the impact resistant capability of the front bumper 232, ends of the front bumper 232 can be connected to the front transverse beam 221 via a shock absorbing ring (a) and at least one first vertical bar 233 is positioned between the front cross bar 231 and the middle transverse beam 223. In the embodiment, two first vertical bars 233 are provided. The first vertical bar 233 is provided with a first column 234 on it to improve the structural connection strength. Specifically, the first vertical bar 233 can be formed by two sections of half vertical bars 2332. The two sections of half vertical bars 2332 can be connected with a shock absorbing rubber post (b) as a transition to improve the impact resistant capability.

The rear bumper system 24 comprises a rear cross bar 241 connected to the rear transverse beam 222 and a rear bumper 242 with both ends connected respectively to the rear cross bar 241 and the rear transverse beam 222. The rear bumper 242 is curved and perpendicular to rear cross bar 241 and the rear transverse beam 222. The rear bumper 242 protrudes relatively to the rear cross bar 241 so that when the electric vehicle suffers rear impact, external force will first acts on the rear bumper 242. Furthermore, the rear bumper 242 can also be designed as a multi-cavity structural rod to improve its buffering and impact resistant capability.

Figure 10:
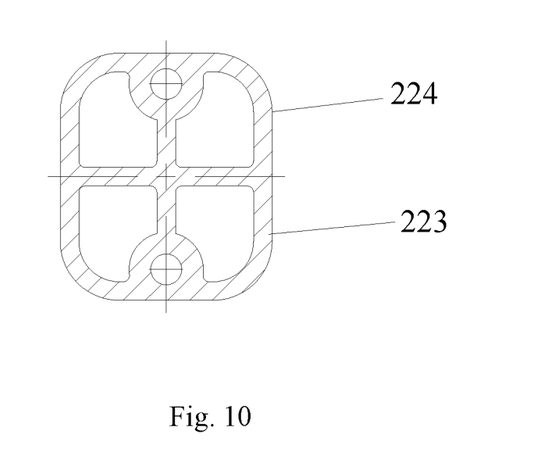
FIG. 10 depicts a sectional view of a front or rear bumper of the electric vehicle frame system in FIG. 1.

FIG. 10 depicts a sectional view of the front bumper 232 and the rear bumper 242 with six independent cavities. These cavities may have any shapes such as circle and polygonal. Furthermore, the first vertical bar 233 can also be designed as a multi-cavity structure. The cavity cross section of the first vertical bar 233 can be the same as those of the front bumper 232 and the rear bumper 242.

To further improve the impact resistant capability of the rear bumper 242, ends of the rear bumper 242 can be connected to the rear transverse beam 222 via a shock absorbing ring (a) (not marked in the drawing) and at least one second vertical bar 243 is positioned between the rear cross bar 241 and the combined transverse beam 224.

In the embodiment, two second vertical bars 243 are provided. The second vertical bar 243 is provided with a second column 244 on it. The second vertical bar 243 can be formed by two sections of half vertical bars 2432. The two sections of half vertical bars 2432 can also be connected with a shock absorbing rubber post (b) as a transition to improve the impact resistant capability. Likewise, the second vertical bar 243 can be designed as a multi-cavity structure. The cavity cross section of the second vertical bar 243 can be the same as those of the front bumper 232 and the rear bumper 242.

Although the present invention has been illustrated and described herein with reference to preferred embodiments, it should not be construed as limiting the scope of the invention. Any modifications, equivalent substitutions or improvements that are within the spirit and principle of the invention are intended to be covered by the protection scope of the invention.

What is claimed is:

1. An electric vehicle frame system, wherein it comprises two multi-cavity box type longitudinal beams which are arranged symmetrically and are made of an aluminium alloy material, and a multi-cavity transverse beam assembly which is connected between the two multi-cavity box type longitudinal beams and is made of aluminium alloy material, a front bumper system and a rear bumper system which are respectively provided at both ends of the multi-cavity box type longitudinal beams, and a B pillar holder provided in the middle of the multi-cavity box type longitudinal beams to hold the B pillar; the multi-cavity box type longitudinal beam is provided internally with multiple independent cavities and comprises a middle section and curved sections provided on both ends of the middle section; the multi-cavity transverse beam assembly includes multiple transverse beams which are provided internally with multiple independent cavities.

2. The electric vehicle frame system according to claim 1, wherein the transverse beam assembly comprises a front transverse beam provided on the front ends of the two multi-cavity box type longitudinal beams, a rear transverse beam provided on the rear ends of the two multi-cavity box type longitudinal beams, two middle transverse beams and two combined transverse beams provided on the middle of the two multi-cavity box type longitudinal beams; the two middle transverse beams are set apart and two combined transverse beams are set apart.

3. The electric vehicle frame system according to claim 2, wherein multiple first reinforcing connecting rods can be provided between the two middle transverse beams.

4. The electric vehicle frame system according to claim 2, wherein multiple second reinforcing connecting rods can be provided between the two combined transverse beams.

5. The electric vehicle frame system according to claim 2, wherein the middle transverse beam comprises an inverted H-shaped base and a rectangular part on the base; the rectangular part is provided internally with multiple independent cavities.

6. The electric vehicle frame system according to claim 5, wherein the combined transverse beam is an axisymmetric structure formed by the two middle transverse beams butted together, with their rectangular parts facing each other.

7. The electric vehicle frame system according to claim 2, wherein the electric vehicle frame system further comprises a first holder provided at the junction of the multi-cavity box type longitudinal beam and the front transverse beam for holding exterior parts, and a second holder provided at the junction of the multi-cavity box type longitudinal beam and the rear transverse beam for holding exterior parts.

8. The electric vehicle frame system according to claim 1, wherein the B pillar holder comprises a U-shaped base and two arc-shaped parts provided at both ends of the U-shaped base; the two arc-shaped parts are curved outwards and connected with the multi-cavity box type longitudinal beam; the U-shaped base body is provided with a reinforcing rib in its middle.

9. The electric vehicle frame system according to claim 2, wherein the front bumper system comprises a front cross bar connected to the front transverse beam and a front bumper with both ends connected respectively to the front cross bar and the front transverse beam; the front bumper is curved and perpendicular to front cross bar and the front transverse beam, and protrudes relatively to the front cross bar.

10. The electric vehicle frame system according to claim 9, wherein ends of the front bumper are connected to the front transverse beam via a shock absorbing ring; at least one first vertical bar is positioned between the front cross bar and the middle transverse beam; the first vertical bar is provided with a first column on it.

11. The electric vehicle frame system according to claim 2, wherein the rear bumper system comprises a rear cross bar connected to the rear transverse beam and a rear bumper with both ends connected respectively to the rear cross bar and the rear transverse beam; the rear bumper is curved and perpendicular to rear cross bar and the rear transverse beam, and protrudes relatively to the rear cross bar.

12. The electric vehicle frame system according to claim 11, wherein ends of the rear bumper are connected to the rear transverse beam via a shock absorbing ring; at least one second vertical bar is positioned between the rear cross bar and the combined transverse beam; the second vertical bar is provided with a second column on it.

\* \* \* \* \*